Feb. 23, 1965   G. P. FORBES   3,170,475
ATTACHMENT FOR A WALKING ASSIST DEVICE
Filed Feb. 11, 1963
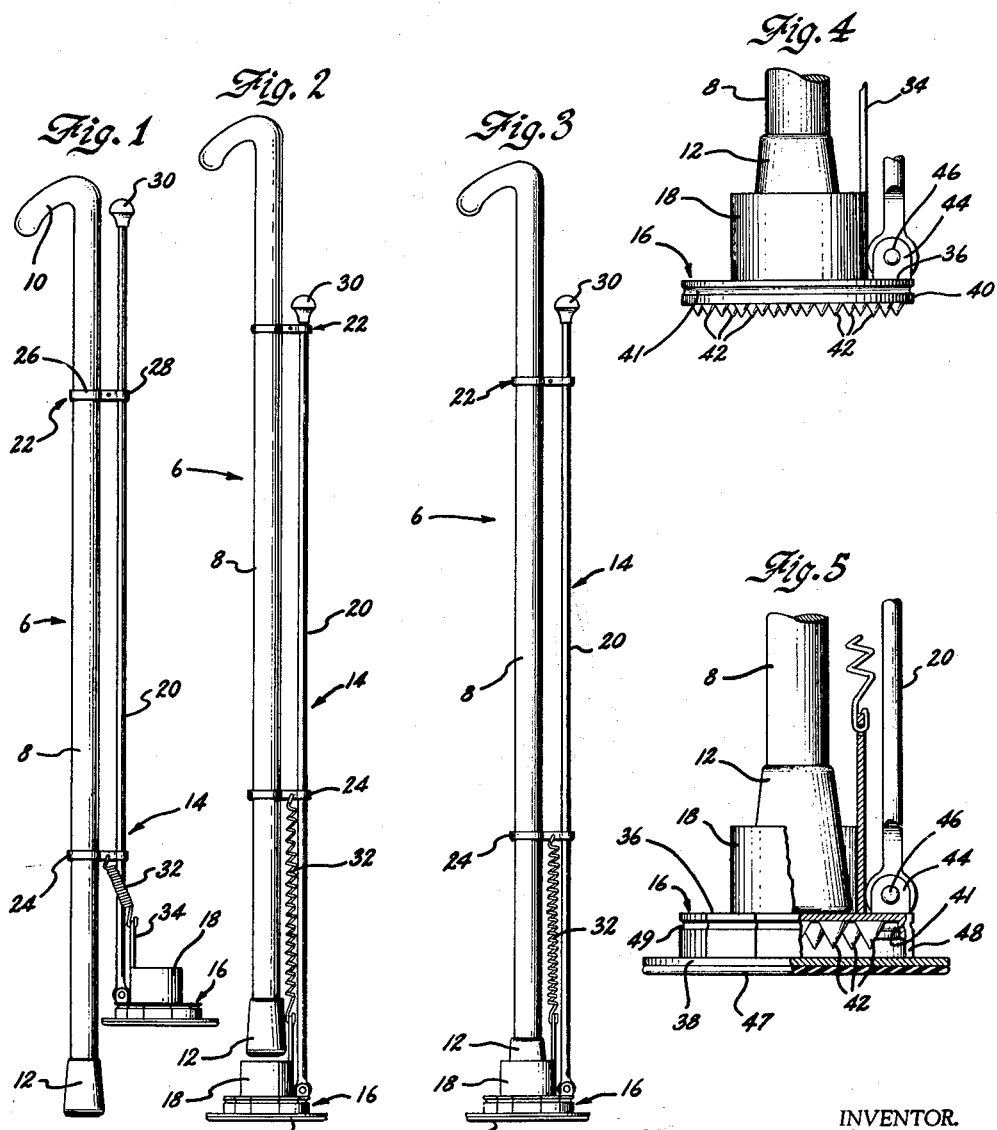
INVENTOR.
Gertrude P. Forbes
BY Roy A. Plant
ATTORNEY United States Patent Office 3,170,475
Patented Feb. 23, 1965

3,170,475
ATTACHMENT FOR A WALKING ASSIST DEVICE
Gertrude P. Forbes, 246 East Ave. N., Battle Creek, Mich.
Filed Feb. 11, 1963, Ser. No. 257,430
9 Claims. (Cl. 135—57)

This invention relates to walking assist devices such as canes, crutches, and the like; and, in particular, to an attachment for such devices adapted to improve the frictional and other ground-engaging characteristics thereof.

Conventional walking sticks, canes, crutches, and the like, such as are used by cripples or those suffering other infirmities, are commonly provided with a rubber cap at the ground-engaging end thereof to improve the frictional characteristics and hence assure against slipping. Such a rubber cap is adequate for its intended purposes when the walking assist device is used on dry, hard pavement or flooring; however, it is not adequate to provide the required nonslipping frictional engagement on slippery surfaces such as waxed floors or icy or snow packed pavement. Also, canes and other walking assist devices as they are presently constructed cannot safely be used on soft surfaces such as wet ground, sand, or loosely packed snow since there is inadequate surface area at the ground-engaging end thereof, and hence inadequate flotation. For these reasons, the mobility of those requiring crutches or the like is presently quite limited. Unless they restrict themselves to walking on dry, hard surfaces, they run the hazard of falling because of the inadequacy of the crutches or the like in providing the necessary ground-engagement characteristics to assure against sticking or slipping. It was a recognition of these and other problems in this art which led to the conception and development of the present invention.

Therefore, the objects and features of the present invention include the provision of a walking assist device which is adapted for safe use not only on dry, hard surfaces, but also on slippery or soft surfaces such as wet ground, icy pavement, and the like.

It is yet another object and feature of this invention to provide a walking assist device which includes an attachment whereby there can be conveniently removably secured over the ground-engaging end of the device a plate which assures adequate flotation and nonslipping characteristics when the device is used on a soft or slippery surface.

It is yet another object and feature of this invention to provide an attachment for a walking assist device, the attachment comprising a plate having a frictional ground-engaging surface on one side thereof, a socket on the other side thereof adapted to matingly engage the lower end of the walking assist device, and means secured to the plate and cooperative with the socket for removably retaining the plate to the lower end of the walking assist device.

It is yet another object and feature of this invention to provide an attachment for a walking assist device comprising a plate having a socket on one side thereof adapted to matingly engage the lower end of the walking assist device, together with means secured to the plate and cooperative with the socket for removably retaining the plate in such position, the plate having a bottom portion particularly useful where the device is used on soft ground, but which is removable to expose a roughened frictional surface which is particularly useful where the device is used on icy pavement.

It is yet another object and feature of this invention to provide an attachment for a walking assist device comprising a plate having a frictional ground-engaging bottom surface and a socket on the upper surface thereof adapted to matingly engage the lower end of the walking assist device, an upwardly extending shaft secured to the plate and rotatably and reciprocably attached to the walking assist device, together with resilient means biased between the device and the plate whereby the plate can be conveniently moved into or out of engagement with the lower end of the device by depressing and rotating the shaft.

Still further objects, features, and advantages of the invention will appear as the description proceeds.

To the accomplishment of the foregoing and related ends, the invention, then, consists of the means hereinafter fully described and particularly pointed out in the claims, the annexed drawings and the following description setting forth in detail certain means for carrying out the invention, such disclosed means illustrating, however, but one of various ways in which the principle of the invention may be used.

In the annexed drawings:

FIGURE 1 is a side elevational view of a cane equipped with an attachment illustrating a preferred embodiment of the invention;

FIGURES 2 and 3 are side elevations of the cane and attachment shown in FIGURE 1 but with the attachment in different positions relative to the cane to illustrate the manner of operation thereof;

FIGURE 4 is an enlarged fragmentary view of the cane and attachment shown in FIGURE 3, but with a part of such attachment removed and illustrating the use of the attachment under one type of condition; and FIGURE 5 is a view corresponding generally to FIGURE 4, but with the aforementioned part of the attachment replaced to illustrate its use under another environmental condition.

Referring now to the drawings, the numeral 6 indicates a walking cane comprising an elongate member 8 having a conventional hook portion 10 at the upper end and a rubber cap 12 fitted over the lower end, the rubber cap forming the ground-engaging end of the cane. In accordance with the present invention, there is secured to the cane an attachment indicated by the numeral 14 and comprising a composite round plate 16 with a socket 18 formed on the upper surface thereof which is shaped to matingly engage the rubber cap 12, a shaft 20 with its lower end rigidly secured to the plate 16 adjacent the periphery thereof and which is attached to the elongate member 8 of the cane by means of clips 22 and 24. Each clip, for example, clip 22, is of generally figure-eight configuration with a large annular portion 26 clamped tightly and immovably around the elongate member 8 of the cane and communicating through a riveted or bolted center portion with a small annular portion 28 which relatively loosely surrounds the shaft 20. Hence, the shaft 20 is free to reciprocate and to rotate within the annular portions 28 of the clips, a hand knob 30 being provided at the top of the shaft for conveniently imparting the reciprocatory and rotary movement thereto. A coil spring 32 is secured between the center of the lowermost clip 24 and a stud 34 integral with and extending upwardly from the socket 18, holes being provided in the top of the stud and in the center portion of clip 24 for reception of the hooked ends of the coil spring.

As can best be seen in FIGURES 4 and 5, in the preferred embodiment shown the plate 16 is of composite construction comprising top and lower plate members 36 and 38, respectively. The top plate member 36, to which the socket 18 is secured, is provided with a downwardly extending peripheral flange 40 with a circumferentially extending annular groove 41 formed therein, the bottom surface of this plate being formed with a plurality of sharp conical projections 42 which extend below the flange 40. As a means for securing the shaft 20 to the plate 16, an upwardly extending tab 44 is formed on the top plate member 36 adjacent the periphery thereof while a bolt or rivet 46 passes through an opening in the tab and an aligned opening in the flattened end portion of the shaft 20 to tightly and non-rotatably secure the shaft to the top plate member 36. The lower plate member 38 is of somewhat larger diameter than the top plate member and has a bottom frictional surface preferably formed by a pad 47 of rubber or the like. An upwardly extending annular flange 48 is formed on the top of the lower plate member, this flange being of a diameter to fit tightly around flange 40 and being provided with a circumferentially extending inwardly directed annular rib 49 which may be removably snapped into mating engagement with the annular groove 41 on flange 40 to thereby secure the bottom plate member to the top plate member. The mating flanges 40 and 48 are formed of a suitable material such as a relatively hard plastic or metal to provide the resiliency required to assure a tight yet removable connection between them when they are matingly engaged as shown in FIGURE 5.

With reference now in particular to FIGURES 1 through 3, the operation of the device is as follows: When the cane is being used on dry, hard pavement, the attachment 14 is in the position as shown in FIGURE 1, the plate 16 with its associated socket being positioned laterally of the elongate member 8 of the cane and being held in this position by the spring 32. When the cane is to be used on soft ground or on slippery pavement, the hand knob 30 is used to depress the shaft, together with the attached plate and socket, against the tension of the spring 32 until the socket extends below the bottom end of cap 12 at which time the knob is turned to thereby rotate the plate and socket into alignment with the cap 12 as illustrated in FIGURE 2. Hand pressure is then removed from the knob 30 and the tension of spring 32 pulls the socket into mating engagement with the cap 12 as shown in FIGURE 3. It will be obvious that in this position the plate provides greatly increased surface area flotation and improved frictional characteristics so that the cane can be used more safely on soft or slippery surfaces. When the cane is to be again used on dry, hard pavement, it is of course only necessary to depress and rotate the knob 30 until the socket and plate are disposed laterally of the cap 12 and then allow the shaft to raise under the tension of the spring to the position shown in FIGURE 1.

If the cane is to be used on a soft surface such as wet ground, sand, loosely packed snow, or the like, the lower plate member 38 is fixed to the top plate member as described above and as illustrated in FIGURES 3 and 5. It is manifest that the larger diameter and therefore the larger surface area of the lower plate member 38 provides optimum assurance against the end of the cane sinking into the soft surface. When the attachment is to be used on icy pavement, the plate 38 is removed to thereby expose the pointed projections 42 as illustrated in FIGURE 4 which, of course, provides optimum frictional characteristics and hence assurance against slippage on the icy surface. If desired, the lower ground-engaging surface of one or both of the plate members 36 and 38 can be slightly convex instead of flat as shown.

Hence, the present invention provides a walking assist device which allows for much greater mobility of the user without fear of sinking or sticking in soft ground or slipping on icy surfaces or the like. It will be understood of course that while the invention has been described specifically with reference to its use on a cane it can be embodied and used with equal advantage on walking sticks, crutches, various types of artificial legs and the like.

While but one form of the invention has been shown and described, other forms will now be apparent to those skilled in the art. Therefore, it will be understood that the embodiment shown in the drawing and described above is merely for illustrative purposes, and is not intended to limit the spirit and scope of the invention.

Other modes of applying the principle of my invention may be employed instead of the one explained, change being made as regards the walking assist device and attachment herein disclosed, provided the means stated by any of the following claims or the equivalent of such stated means be employed.

I therefore particularly point out and distinctly claim as my invention:

1. An attachment for a walking assist device of the type having an elongate member with a ground-engaging lower end portion, said attachment comprising a round top plate member with a bottom frictional surface and with a socket extending from the upper surface thereof, resilient means connected to said top plate member for removably retaining said socket in mating engagement with the lower end portion of said elongate member, a round lower plate member having a diameter greater than that of said top plate member and having a bottom surface with frictional characteristics differing from those of the bottom surface of the top plate member, and means for removably securing said lower plate member over the bottom surface of said top plate member.

2. An attachment for a walking assist device of the type having an elongate member with a lower ground-engaging end portion, said attachment comprising a plate having a frictional ground-engaging bottom surface and a socket on the upper surface thereof adapted to matingly engage the lower end portion of the elongate member, an upwardly extending shaft secured to said plate, said shaft being rotatably mounted in a plurality of clips adapted to be secured to said elongate member at spaced points thereon to thereby retain said shaft and plate on said device, and a resilient member connected to said plate and to said elongate member to tension said plate and said shaft upwardly with respect to said elongate member whereby said shaft can be pressed downwardly against the tension of said resilient member and rotated within said clips to thereby move said socket into and out of engagement with the end portion of the elongate member.

3. An attachment for a walking assist device of the type having an elongate member with a lower ground-engaging end portion, said attachment comprising a plate having a frictional ground-engaging bottom surface and a socket on the upper surface thereof adapted to matingly engage the lower end portion of the elongate member, an upwardly extending shaft secured to said plate adjacent the periphery thereof, said shaft being rotatably mounted in a plurality of clips adapted to be secured to said elongate member at spaced points thereon to thereby retain said shaft and plate on said device, a coil spring having one end connected to said plate radially inwardly of said shaft and the other end secured to the clip closest to the lower end portion of the device, and a knob on the upper end of said shaft whereby said shaft can be pressed downwardly against the tension of said spring and rotated within said clips to thereby move said socket into and out of engagement with the end portion of the elongate member.

4. A walking assist device comprising an elongate member with a ground-engageable lower end portion, a plate having a frictional ground-engageable bottom surface and a socket on the upper surface thereof adapted to matingly engage the lower end portion of the elongate member, an upwardly extending shaft secured to said plate, means mounted on said elongate member for supporting said shaft for both rotation and endwise reciprocation with respect to said elongate member, and a resilient member having one end connected to said plate and the other end connected to said elongate member whereby said shaft can be pressed downwardly against the tension of said resilient member and rotated to thereby move said socket into and out of engagement with the end portion of the elongate member.

5. A walking assist device comprising an elongate member with a ground-engageable lower end portion, a plate having a frictional ground-engageable bottom surface and a socket on the upper surface thereof adapted to matingly engage the lower end portion of the elongate member, an upwardly extending shaft secured to said plate adjacent the periphery thereof, said shaft being mounted for rotation and reciprocation in a plurality of clips secured to said elongate member at spaced points thereon, a coil spring having one end secured to said plate radially inwardly of said shaft and the other end secured to the clip closest to the lower end portion of the elongate member, and a knob on the upper end of said shaft whereby said shaft can be pressed downwardly against the tension of said spring and rotated within said clips to thereby move said socket into and out of engagement with the end portion of the elongate member.

6. An attachment for a walking assist device of the type having an elongate member with a ground-engaging lower end portion, said attachment comprising a top plate member having a bottom frictional surface and a socket extending from the upper surface thereof, means connected to said plate member for removably retaining said socket in mating engagement with said lower end portion of said elongate member, a lower plate member having an area greater than that of said top plate member and having a bottom surface with frictional characteristics differing from those of the bottom surface of said top plate member, and means for removably securing said lower plate member over the bottom surface of said top plate member.

7. An attachment for a walking assist device of the type having an elongate member with a ground-engaging lower end portion, said attachment comprising a plate having a frictional ground-engaging surface on one side thereof and a socket on the other side thereof for receiving said ground-engaging lower end portion of said elongate member, a shaft with means for actuating same, means on said elongate member supporting said shaft for movement of the latter endwise alongside said elongate member, means mounting said plate on the lower end of said shaft for endwise reciprocable movement by same of said plate both alongside and below the lower end of said elongate member and rotation in a plane substantially perpendicular to said elongate member into and out of alignment with said lower end portion thereof when below same for engagement with and disengagement of said socket from said lower end portion of said elongate member, and means for holding said plate with said socket in engagement with said lower end portion of said elongate member when in use, and retracted above the lower end portion of said elongate member when not in use.

8. An attachment as set forth in claim 7 wherein said means for holding said plate in engagement with said lower end portion of said elongate member as well as retracted when disengaged from same is a resilient means connected to said socket carrying plate at one end and supported at its other end in elevated position by said elongate member.

9. An attachment as set forth in claim 8 wherein said resilient means comprises a tension coil spring having one end connected to said socket carrying plate and the other end supported by said elongate member at a point thereon spaced above said lower end portion thereof so as to supply holding tension on said socket, when in engagement with said lower end portion of said elongate member, as well as elevating tension when disengaged from same.

References Cited by the Examiner
UNITED STATES PATENTS

| | | | |
|---|---|---|---|
| 822,400 | 6/06 | Stock | 215—45 X |
| 1,031,247 | 7/12 | Conrad | 135—57 |
| 1,284,991 | 11/18 | Beecroft | 135—57 |
| 1,504,902 | 8/24 | Rosenhein | 135—57 |

HARRISON R. MOSELEY, *Primary Examiner.*